(12) United States Patent  
Coles et al.

(10) Patent No.: US 8,980,383 B2
(45) Date of Patent: Mar. 17, 2015

(54) WIDE TEMPERATURE-RANGE SMECTIC LIQUID CRYSTAL MATERIALS

(75) Inventors: Harry J. Coles, Ely (GB); Damian J. Gardiner, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 662 days.

(21) Appl. No.: 13/140,145

(22) PCT Filed: Dec. 17, 2009

(86) PCT No.: PCT/IB2009/055819
§ 371 (c)(1),
(2), (4) Date: Jun. 16, 2011

(87) PCT Pub. No.: WO2010/070606
PCT Pub. Date: Jun. 24, 2010

(65) Prior Publication Data
US 2012/0032994 A1 Feb. 9, 2012

(30) Foreign Application Priority Data

Dec. 18, 2008 (GB) .................................... 0823013.8

(51) Int. Cl.
*C09K 19/20* (2006.01)
*C09K 19/12* (2006.01)
(Continued)

(52) U.S. Cl.
CPC ............... *C09K 19/58* (2013.01); *C09K 19/406* (2013.01); *C09K 19/408* (2013.01)
USPC ................. 428/1.1; 252/299.5; 252/299.63; 252/299.65; 252/299.66; 252/299.67; 349/86; 349/184; 349/186

(58) Field of Classification Search
CPC .. C09K 19/406; C09K 19/408; C09K 19/544; C09K 19/586; G02F 1/1334; G02F 1/1391; G02F 3/02
USPC ............... 252/299.5, 299.66, 299.67, 299.61, 252/299.65, 299.6; 349/133, 86, 183, 184, 349/186; 428/1.1
See application file for complete search history.

(56) References Cited

U.S. PATENT DOCUMENTS 3,947,375 A 3/1976 Gray et al.
4,464,020 A 8/1984 Le Berre et al.
(Continued)

FOREIGN PATENT DOCUMENTS

CN 1836025 A 9/2006
EP 0 643 120 3/1995
(Continued)

OTHER PUBLICATIONS

Pugh et al., *Induction of Smectic Layering in Nematic Liquid Crystals Using Immiscible Components. 2. Laterally Attached Side-Chain Liquid-Crystalline Poly(norbornene)s and Their Low-Molar-Mass Analogues with Hydrocarbon/Oligodimethylsiloxane Substituents*, Macromolecules, Aug. 11, 1998, vol. 31, pp. 5188-5200 (Published on Web Jul. 15, 1998).
(Continued)

*Primary Examiner* — Shean C Wu
(74) *Attorney, Agent, or Firm* — Burr & Brown, PLLC

(57) ABSTRACT

A method of making a wide temperature-range smectic liquid crystal material comprises taking a wide temperature-range nematic mixture and doping this with a mesogenic silicon-containing material. Aspects of the invention provide wide temperature-range smectic materials and devices using the smectic materials.

32 Claims, 8 Drawing Sheets

(51) Int. Cl.
  *C09K 19/42*  (2006.01)
  *C09K 19/44*  (2006.01)
  *C09K 19/46*  (2006.01)
  *C09K 19/58*  (2006.01)
  *G02F 1/1333* (2006.01)
  *G02F 1/1334* (2006.01)
  *C09K 19/40*  (2006.01)

(56) References Cited

U.S. PATENT DOCUMENTS

| | | | |
|---|---|---|---|
| 4,474,679 | A | 10/1984 | Dubois et al. |
| 4,702,558 | A | 10/1987 | Coles et al. |
| 5,188,762 | A | 2/1993 | Iwaki et al. |
| 5,455,697 | A | 10/1995 | Coles et al. |
| 5,498,368 | A | 3/1996 | Coles |
| 5,547,604 | A | 8/1996 | Coles et al. |
| 5,855,813 | A | 1/1999 | Coles et al. |
| 2005/0001200 | A1 | 1/2005 | Goodby et al. |
| 2007/0131904 | A1 | 6/2007 | Crossland |
| 2007/0298192 | A1 | 12/2007 | Uehira et al. |
| 2008/0049175 | A1 | 2/2008 | Komitov et al. |
| 2009/0185129 | A1 | 7/2009 | Clapp et al. |

FOREIGN PATENT DOCUMENTS

| | | |
|---|---|---|
| GB | 1 433 130 | 4/1976 |
| GB | 2 146 787 | 4/1985 |
| GB | 2 274 652 | 8/1994 |
| GB | 2 317 185 | 3/1998 |
| GB | 2 356 629 | 5/2001 |
| JP | 05-078669 | 3/1993 |
| JP | 05-194542 | 8/1993 |
| JP | 06-065259 | 3/1994 |
| WO | 03/040074 | 5/2003 |
| WO | 03/040812 | 5/2003 |
| WO | 2007/123844 | 11/2007 |

OTHER PUBLICATIONS

Jones et al., *Director structures in achiral smectic C liquid crystal cells: field-induced twist domain nucleation,* Liquid Crystals, vol. 33, No. 1, Jan. 2006, pp. 25-32.

J. Naciri, *Low transition temperature organosiloxane liquid crystals displaying a de Vries smectic A phase,* Lquid Crystals, 2003, vol. 30, No. 2, pp. 219-255.

Gardiner et al., *Electro-optic bistability in organosiloxane bimesogenic liquid crystals,* Journal of Applied Physics 99, 113517 (2006), pp. 1-7.

Gardiner et al., *Organosiloxane liquid crystals for fast-switching bistable scattering devices,* Journal of Physics D: Applied Physics, vol. 39 (2006), pp. 4948-4955.

Gardiner et al., *Optimisation of organosiloxane mesogenic properties for use in a smectic-A display,* Emerging Liquid Crystal Technologies, Proceeding of SPIE, vol. 5741, pp. 239-247.

Gardiner et al., *Highly anisotropic conductivity in organosiloxane liquid crystals,* Journal of Applied Physics, vol. 100, 124903 (2006), pp. 1-8.

Chinese Office Action from a corresponding Chinese patent application bearing a mailing date of Jan. 22, 2013, 9 Pages, No English translation.

M. Blinov and V.G. Chigrinov, Electrooptic Effects in Liquid Crystal Materials, Springer-Verlag, New York, 1996.

Licristal® catalogue, Merck, May 2002.

Licrilite® datasheet, Dec. 1995.

Licristal®, Technical data sheet, Aug. 4, 2005.

European Opposition from a corresponding European patent application bearing a mailing date of Jun. 4, 2014.

WIDE TEMPERATURE-RANGE SMECTIC LIQUID CRYSTAL MATERIALS

BACKGROUND

Liquid crystal materials for use in display devices and light shutters are broadly of two types: nematic and smectic.

Nematic materials have long range orientational order, with molecules being free to move past one another in different directions while retaining a statistically parallel orientation of their long axes ('the director'). The nematic phase is highly fluid and is used in display modes such as twisted nematic, supertwist, hybrid aligned mode, and bistable modes such as ZBD and PABN. Nematic polymer-dispersed liquid crystals (PDLC) are used in switchable glazing technology. However, they require constant power to maintain an ON-state and, moreover, exhibit unwanted haze at wide viewing angles.

Smectic liquid crystals have a layer structure and are more viscous than nematic materials. Molecules have orientational and positional order within a layer, but layers can move relative to each other. A smectic material may exist as one of a number of possible polymorphic modifications, depending on the arrangement of molecules within the layers. For example, molecules in a Smectic A phase have their long axes statistically perpendicular to the plane of the layers and the lateral distribution of the molecules within a layer is random. Molecules in a Smectic C phase also have a random lateral distribution but have their long axes tilted with respect to the plane of the layers.

Smectic A materials have been used in bistable displays (FIG. 1) which are written by inducing a highly scattering texture resulting from the motion of doped charged impurities under dc or low frequency ac electric fields. Erasure is by dielectric reorientation, at higher ac frequencies, to an optically clear state.

Smectic C materials have found use in fast-switching bistable displays based on the discovery that optically active Smectic C materials are ferroelectric, anitferroelectric or ferrielectric, and can be rapidly switched between two states if a suitably aligned thin (1-2 μm) layer is used.

A smectic material may exhibit different polymorphic modifications at different temperatures, and may reversibly transform to a nematic material at higher temperatures before becoming an isotropic liquid at a still-higher temperature (the clearing temperature).

Much work has been done by formulation chemists to produce mixtures of liquid crystal materials which are stable in the nematic phase over a wide temperature range, including temperatures both substantially above and substantially below room temperature, for both storage and operational purposes. A large number of wide temperature-range nematic materials have been made and are commercially available, typically with a number of components whose properties and proportions are carefully optimised to suit a particular display application. However, wide temperature-range smectic materials, in which the material exhibits a single polymorphic modification throughout the specified range, are not widely available and may not be optimised for different applications.

Aspects of the present invention are specified in the independent claims. Preferred features are specified in the dependent claims.

We have surprisingly found that a wide temperature-range smectic liquid crystal material may be made by taking a wide temperature-range nematic mixture and doping this with a mesogenic silicon-containing material. The host nematic mixtures may have been optimised in various ways (e.g. dielectric and optical anisotropies, switching speed etc.). Nematic mixtures are very complicated formulations, precisely formed in a balanced way; indeed it is known that some mixtures may require up to 20 individual components to achieve the necessary characteristics. Improper mixing of these components, or the presence of other additives, usually leads to unexpected and negative effects on the performance of the mixture. It is therefore a very surprising result that the addition of siloxane to such a complex mixture still generates a smectic phase of a practical temperature range. Additionally, these smectic mixtures are further useful since they retain, to a large extent, the other desirable characteristics of the host nematic material (e.g. optical anisotropy).

We have found that by forming specific mixtures of organosiloxane liquid crystals and non-siloxane liquid crystal materials, the overall material performance can be dramatically enhanced and tuned according to requirement. In addition, it is possible to use pseudo-LC organosiloxane materials as the additive. The pseudo-material contains an organosiloxane moiety and may induce smectic ordering within the mixture. These additives may contain chiral agents, chromophores, dichroic or fluorescent dyes, dielectric or refractive index enhancers or reducers, or others, for example.

DEFINITIONS

The term 'wide temperature-range' is used herein to denote a temperature range of at least 70° C. The range is preferably at least minus 20° C. to plus 50° C. It is particularly preferred that the range extends to at least −30° C. at the bottom end, notably −40° C., and to at least +60° C. at the top end, notably at least +80° C. Thus, according to an aspect of the invention, a wide-ranging nematic mixture (exhibiting a nematic phase over at least a 70° range) is doped with a mesogenic silicon-containing material and converted to a material which exhibits a smectic mesophase over the same temperature range. It will be understood that the nematic or smectic phase may also be stable over a wider temperature range than the specified range, which is a minimum range. It will also be understood that the smectic phase may be converted to a nematic phase when heated above the specified range, or the smectic phase may be converted directly to an isotropic liquid when heated above the specified range.

The term 'mesogenic . . . material' is used herein to denote materials with a rod-shaped or board-shaped mesogenic moiety, ie a moiety with the ability to induce mesophase (liquid crystal) behaviour in a compound comprising said moiety. These materials do not necessarily have to exhibit mesophase behaviour themselves. Sometimes these compounds show mesophase behaviour only in mixtures with other compounds or, in the case of polymerizable compounds, when these compounds or mixtures thereof are polymerized. The mesogenic silicon-containing material is preferably a siloxane (ie one that contains an Si—O linkage, typically an Si—O—Si linkage) but could alternatively contain only a single Si atom bonded to four C atoms, or a silane (Si—Si) linkage. For convenience herein, the invention will be described with reference to mesogenic siloxane materials.

BRIEF DESCRIPTION OF THE DRAWINGS

The invention will now be further described, by way of example only, with reference to the following drawings in which.

DETAILED DESCRIPTION

Figure 1:
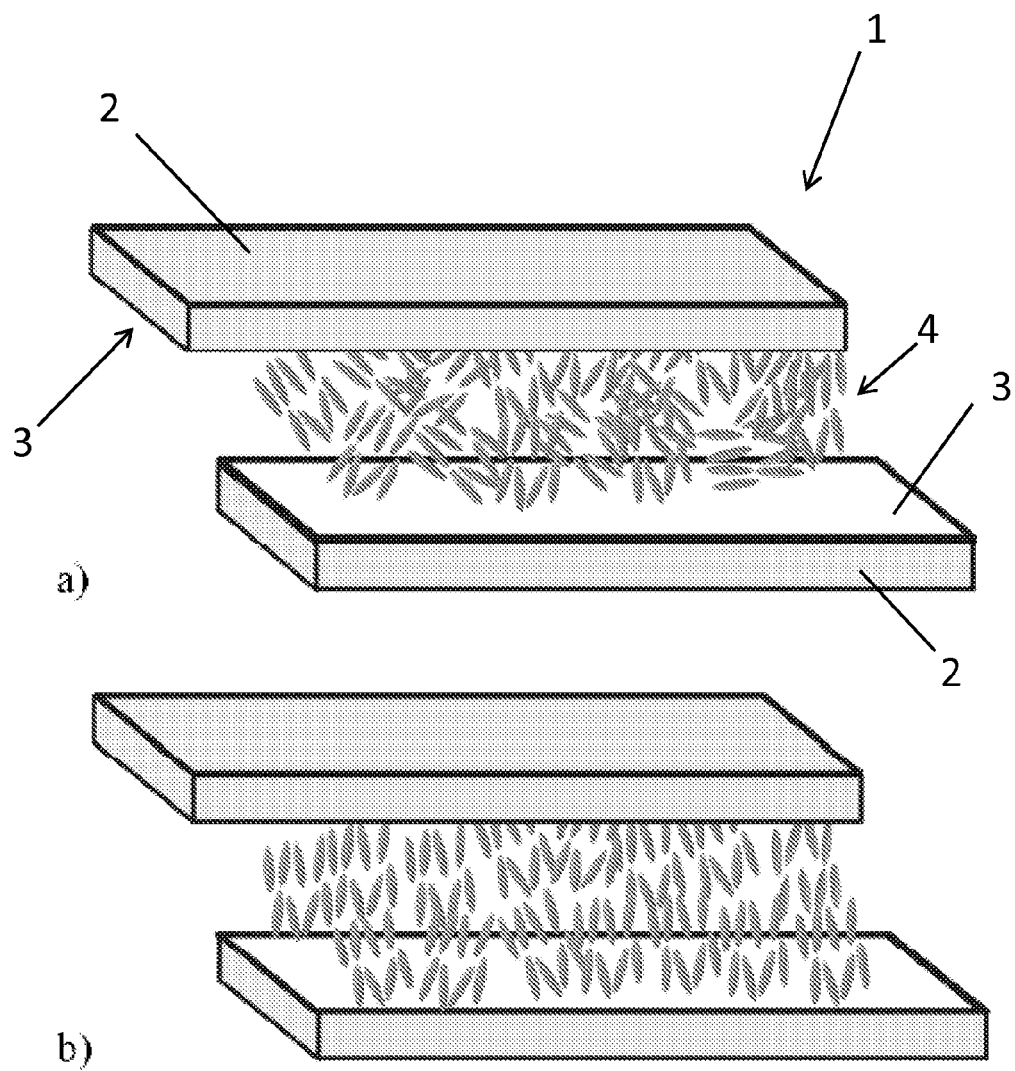
FIG. 1 is a schematic diagram showing different optical states of a prior art Smectic A device.

In the prior art device 1 of FIG. 1, a Smectic A liquid crystal material 4 is sandwiched between two transparent, spaced-apart cell walls 2. An inner surface of each cell wall 2 is provided with an electrode 3, in this example a transparent electrode such as indium tin oxide (ITO). In the 'write' state shown in the upper representation (a) the Smectic A material 4 is in a highly scattering focal conic texture due to motion of charged impurities at lower ac frequencies (eg 100 Hz or less) applied via the electrodes 3. Typically, the feature (domain) size of the scattering texture is of the order of about 1 μm. In the 'erase' state shown in the lower representation (b) an optically clear state is induced by dielectric reorientation of the liquid crystal 4 by a higher frequency ac field (eg 1 kHz). Each state is stable in the absence of an applied field or external force. Because of the high viscosity of the Smectic A phase, either induced state can be stored indefinitely. The domain or feature size could be further controlled or modified, by one skilled in the art, by the inclusion of a High Twisting Power chiral additive in trace amounts (less than 3% by weight concentration), such as BDH 1281 or 1305 and sold by Merck NB-C. In alternative embodiments, one of the electrodes 3 may be patterned or interdigitated to allow the application of in-plane fields which can be used to produce scattering or clear textures. In these alternative embodiment, the other electrode 3 is not required, and the in-plane electrodes may optionally be opaque, for example formed of a metal such as chrome. The use of chrome interdigitated or patterned electrodes has been found to reduce or prevent light bleed through the opaque state.

To date, a significant problem with smectic A devices is that the driving voltages, especially to induce the scattering (opaque) texture, have been too high. Additionally, it is frequently necessary to pre-form devices ('burn in') to initially induce the scattering texture (e.g. for several thousand cycles). A further undesirable characteristic is the requirement to have relatively high conductivity to observe the scattering texture (>5×10⁻⁸ Ωcm⁻¹). The high conductivity is undesirable since power consumption is increased and device lifetime is reduced.

Compositions in accordance with the present invention demonstrate:

1. Lower voltages for both clear and scattering textures. Ability to select arbitrary voltages.
2. Removal of need to pre-form devices
3. Lower conductivity to observe scattering textures
4. Colour using chromophoric materials The novel mixtures allow the production of devices which hitherto, were not possible; e.g. devices in which the scattering and clearing voltages are identical, or a fixed ratio of each other. Another benefit is the ability to switch between clear and scattering, or scattering and clear, modes from a fixed frequency, variable voltage supply. Colour may be similarly produced using siloxane and non-siloxane chromophores or colour-reflecting substrates.

Figure 3:
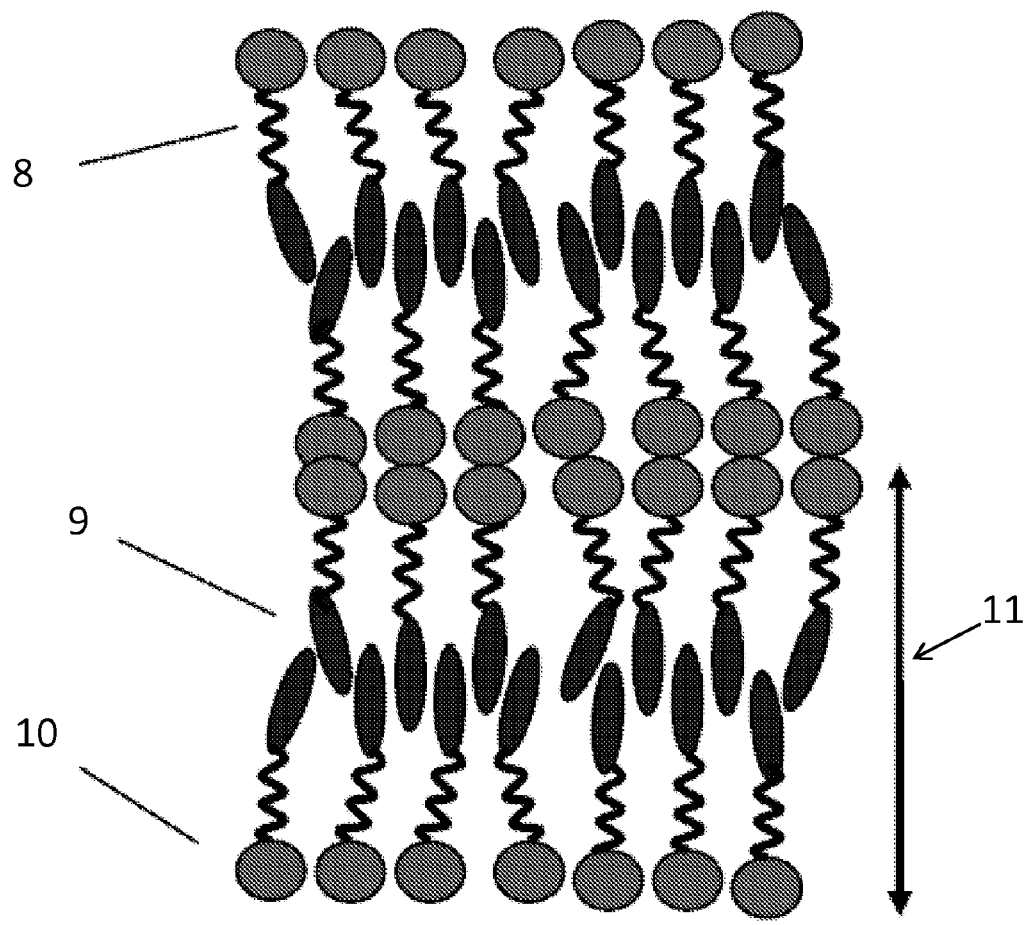
FIG. 3 is a schematic representation of the molecular arrangement for an organosiloxane Smectic A liquid crystal material in accordance with an aspect of the present invention.

The mixtures are prepared by doping a variable quantity of organosiloxane material, 1% to 99% into a host nematic liquid crystal mixture. A preferred dopant level is 20-80%, notably 30-60%. The host nematic mixtures are commercially available (e.g. from Merck, Germany). The molecular arrangement for an organosiloxane Smectic A liquid crystal material is shown schematically in FIG. 3. An alkylene chain 8 links a mesogenic moiety 9 and a siloxane moiety 10. The Smectic A material exists in layers 11 in which the siloxane moieties 10 are separated into distinct sub-layers from the mesogenic moieties 9.

As dopants were used siloxane materials of general structure (a), (b) or (c):

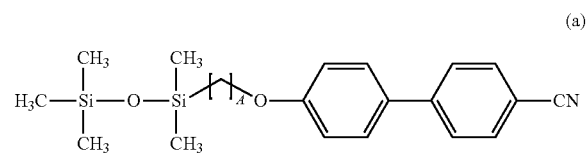

(a)

This series of compounds will be referred to as "A/2" where A is the number of carbon atoms the alkylene chain in the spacer linking the siloxane moiety with the 4'-cyanobiphenyl-4-yl mesogenic unit and 2 represents the number of silicon atoms in the siloxane moiety.

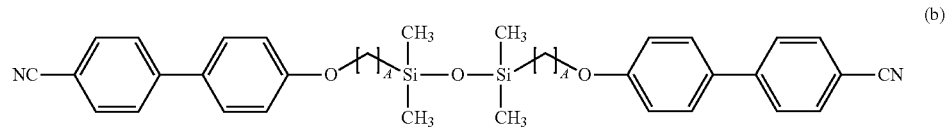

(b)

This series of compounds will be referred to as "A/2/A" where A and 2 have the same meanings as for (a) above.

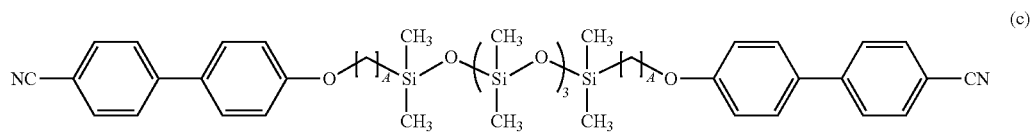

(c)

This series of compounds will be referred to as "A/5/A" where A has the same meaning as for (a) above, and 5 refers to the number of silicon atoms in the siloxane moiety.

Properties of these series of compounds are described by the inventors in J. Appl. Phys. 100, 124903 (2006)

In Table 1, the effect of doping one organosiloxane liquid crystal—"8/2"—into the commercial material BL006 (Merck Chemicals GMbH) is shown. Up to concentrations greater than 60% w/w BL006, this mixture possesses a wide temperature range Smectic A phase. The lower temperature limit has not been specified as such; however, the 40% 8/2—60% BL006 mixture was cooled to —50° C. with no evidence of crystallization. The high-end operating temperatures shown here are very adequate for practical applications.

TABLE 1

Effect of organosiloxane concentration in host BL006.

| 8/2 Concentration (% w/w) | Phase sequence (I - N - $S_A$ - Cr*) | Dielectric Anisotropy | Birefringence | Conductivity ratio |
|---|---|---|---|---|
| 0% | 107° C.-XX° C.-(-25° C.) | 17 | 0.286 | >1 |
| 20% | 90° C.-XX° C. | 10.5 | — | >1 |
| 40% | 78° C.-74° C. | 7.2 | 0.227 | 0.58 |
| 60% | XX° C.-83° C. | 3.7 | — | 0.42 |
| 80% | XX° C.-77° C. | 2.5 | — | 0.07 |
| 100% | XX° C.-63° C. | 0.8 | 0.14 | 0.01 |

TABLE 2

Effect of different organosiloxane dopants on material properties.

| Organosiloxane | Nematic Host | Phase sequence (I - N - $S_A$ - Cr*) | Dielectric Anisotropy | Conductivity ratio |
|---|---|---|---|---|
| 5/2* | BL006 | 79° C.-58° C. | — | — |
| 8/2 | BL006 | 78° C.-74° C.-(-50° C.) | 7.2 | 0.58 |
| 10/2* | BL006 | 88° C.-73° C. | — | — |
| 8/2/8* | BL006 | 103° C.-73° C. | — | — |
| 8/5/8 | BL006 | 96° C.-88° C. | 5.6 | 0.67 |

These data show again that wide temperature Smectic A phases can be generated with different kinds of organosiloxane dopant. The general trend appears to be that increasing the relative amount of siloxane increases Smectic A phase stability.

In Table 3, the effect of changing the nematic host mixture is shown. A wide variety of mixtures were tested from two different suppliers—Huarui (China, "PDLC 004" and "TK6915") and Merck chemicals (remainder). In each case, 40% dopant by weight was used unless otherwise indicated. As is evident, similar behaviour can be found i.e. induction of the Smectic A phase in the material.

TABLE 3

Effect of nematic host on mixture properties.

| Organosiloxane | Nematic Host | Phase sequence (I - N - $S_A$ - Cr*) | Dielectric Anisotropy | Birefringence | Conductivity Ratio |
|---|---|---|---|---|---|
| 8/2 | BL006 | 78° C.-74° C. | 7.2 | 0.227 | 0.58 |
| 8/2 | TK6915 | 50° C.-35° C. | 10.2 | — | 0.8 |
| 5/2 | E49 (50%) | XX° C.-57° C. | 4.4 | — | 0.13 |
| 8/2 | MLC-6023* | 65° C.-41° C. | — | — | — |
| 5/2 | MLC-6828 (80%) | XX° C.-54° C. | 2.3 | — | 0.26 |
| 8/2 | ZLI-1840 (50%) | XX° C.-66° C. | 5.9 | 0.146 | 0.8 |
| 8/2 | PDLC004 | 71° C.-65° C. | 5.4 | — | 0.34 |
| 5/2 | 8CB | XX° C.-42° C. | 5.4 | — | 0.28 |

*indicates monostable Smectic A phase.

The effect of changing the nature of the organosiloxane dopant is shown in Table 2 below. A concentration of 40% w/w dopant in host nematic BL006 was used. The dopants include 3 monomesogens, which possess an identical siloxane group and aromatic core but different alkylene chain lengths i.e. 5/2, 8/2 and 10/2. Also included are two bimesogen liquid crystals which have the same alkylene chain length but different siloxane content: 8/2/8 and 8/5/8, respectively.

From the data it is also evident that the birefringence can also be altered. There exist mixtures with extremely low birefringence (e.g. 0.05 to 0.1) that would be useful in certain applications.

Properties of the commercially-available nematic hosts are given in Table 4. For those nematic hosts designed to have high dielectric anisotropy (e.g. TK6915) or low birefringence (ZLI-1840) these properties are substantially retained in the resultant Smectic A mixture.

TABLE 4

Properties of Nematic Host Mixtures

| Nematic Host | Supplier | Temp. Range | Δε | Birefringence | Component types |
|---|---|---|---|---|---|
| BL006 | Merck | 113 C.-(-20° C.) | 17.3 | 0.286 | cyanobiphenyl, cyanoterphenyl |
| TK-6915-000 | Huarui | 88° C.-(-40° C.) | 29.3 | 0.15 | Fluorinated ester-linked biphen |
| E49 | Merck | 100° C. | 17 | 0.25 | Cyanobiphenyl, terphenyl, Triflurobenzene,, ester link |

TABLE 4-continued

Properties of Nematic Host Mixtures

| Nematic Host | Supplier | Temp. Range | Δε | Birefringence | Component types |
|---|---|---|---|---|---|
| MLC-6023-100 | Merck | 100° C. | 4.5 | 0.0835 | PCH |
| | | | | | Triflurobenzene,, ester link |
| MLC-6828 | Merck | 92.5° C. | — | 0.142 | PCH |
| ZLI-1840 | Merck | 90° C. | 10 | 0.146 | cyanobiphenyl, cyanoterphenyl |
| PDLC004 | Huarui | 109° C.-(−30° C.) | 11.4 | 0.225 | |

An important use of these Smectic A materials of embodiments of the present invention is envisaged to be in electro-optic devices using the bistability phenomenon in the Smectic A liquid crystal phase. The key material properties are:
1. Operational temperature range
2. Dielectric anisotropy
3. Conductivity anisotropy
4. Birefringence We have shown previously that, generally, for low operating voltages, one requires both high $\Delta\epsilon$ and high conductivity anisotropy. However, this is a trade-off since increasing the amount of nematic LC increases dielectric anisotropy but at the expense of conductivity anisotropy.

Table 5 compares mixtures in accordance with embodiments of the present invention with the current state of the art. These materials were optimised for low-voltage operation. The materials developed by Polydisplay are the result of extensive optimisation over a 20 year period, and those of Dow Corning ('DC') over a 10 year period; for the mixtures reported here it is likely that significant improvement can be expected still.

TABLE 5

Some material operating characteristics. The data are for cells with thicknesses of approximately 14-16 μm.

| Mixture | Max Operating Temperature (° C.) | Scattering Threshold Voltage (100 Hz), V (rms) | Erase Threshold Voltage (2 kHz), V (rms) | Erase response time (120 V, 2 kHz) | Contrast Ratio (monochromatic, detector positioned ~20 cm away) |
|---|---|---|---|---|---|
| Polydisplay | 52 | 105 V | 53 V | | |
| DC formulation 2 | 72 | 112 V | 60 V | 104 ms | 211:1 |
| 40% 8/2 in BL006 | 78 | 104 V | 49 V | 30 ms | 268:1 |
| 50% 5/2 in E49 | 73 | 101 V | 89 V | | |

TABLE 6

Material Phase Transitions

| Composition* | | N | SA | Kr | SA Phase Width |
|---|---|---|---|---|---|
| 8/2 | BL006 | 78° C. | 74° C. | <−50° C. | >124° C. |
| 8/2/8 | BL006 | 103° C. | 73° C. | −35° C. | 108° C. |
| 8/5/8 | BL006 | 96° C. | 88° C. | <−40° C. | >128° C. |
| 8/2 | TK6915 | 50° C. | 35° C. | <−40° C. | >75° C. |
| 5/2 | E49 (50%) | — | 57° C. | <−40° C. | >97° C. |
| | BL006 | 113° C. | — | −20° C. | — |
| | TK6915-000 | 88° C. | — | −40° C. | — |
| | E49 | 100° C. | — | — | — |
| 5/2 | | — | 52.4° C. | 32.4° C. | 20° C. |
| 8/2 | | — | 62.1° C. | 42.1° C. | 20° C. |
| 8/2/8 | | — | 102.1° C. | 87.7° C. | 14.4° C. |
| 8/5/8 | | — | 72.5° C. | 16° C. | 56.5° C. |

*The concentrations are 40% siloxane to 60% nematic unless otherwise stated. The 8/2 in BL006 compound was tested earlier on a separate system and the lower limit was less than −50° C. For the other compounds the lower limit was −40° C.

By way of comparison, a mixture comprising 40% w/w of 10OCB in BL006 nematic host was prepared. 10OCB is an analogous Smectic A-only cyanobiphenyl liquid crystal material without a siloxane moiety. This mixture possesses a nematic phase only, and appears to crystallize directly from the nematic phase at room temperature.

Information regarding the temperature range of some of the Smectic A materials is summarised in Table 6. In each mixture in accordance with an embodiment of the invention, a mixture having a nematic phase range of greater than 70° C. is converted to a mixture having a Smectic A phase range is greater than 70° C.

Reduction of the drive voltages will allow the use of commercial or standard display drivers. For example, drivers for electroluminescent panels are readily available up to 125V rms, with frequencies ranging from 50 Hz to 1000 Hz. Prior Smectic A display implementation has necessitated the use of expensive, custom designed circuits. Therefore, use of these materials will significantly ease device electronics design. It should be further noted that the voltage information provided in the table above is for cells that are 14-16 μm thick. Practically, one can use much thinner cells e.g. 7 μm for devices. This would considerably lower driving voltages (roughly half those of 14 μm) and further reduce response times.

For the 'write' state the threshold depends upon the thickness of the layer, d, the dielectric permittivity parallel to the director, $\in_\parallel$, and the conductivity ratio, where the subscripts refer to parallel and perpendicular to the director. Explicitly, this is given by $$V_{write}^2 \propto \frac{d}{\varepsilon_\parallel\left(1-\frac{\sigma_\parallel}{\sigma_\perp}\right)} \quad (1)$$

where the voltage $V_{write}$ corresponds to the highly scattering texture. On the other hand, for the 'erase' state, the threshold depends upon the dielectric anisotropy, $\Delta\in$ ($\in_\parallel - \in_\perp$) and the thickness of the layer. This is written as $$V_{erase}^2 \propto \frac{d}{\Delta\varepsilon} \quad (2)$$

where $V_{erase}$ refers to the transition from scattering to clear.

Experiment

An experimental light shutter device was made using 40% 8/2 in BL006 (Sample A). To facilitate the scattering process, an ionic additive cetyltrimethylammonium bromide (CTAB, Aldrich) was added at 0.1% ww. Another light shutter device was made by doping Sample A with 4% w/w of a commercial black dye (Sample B).

Figure 2:
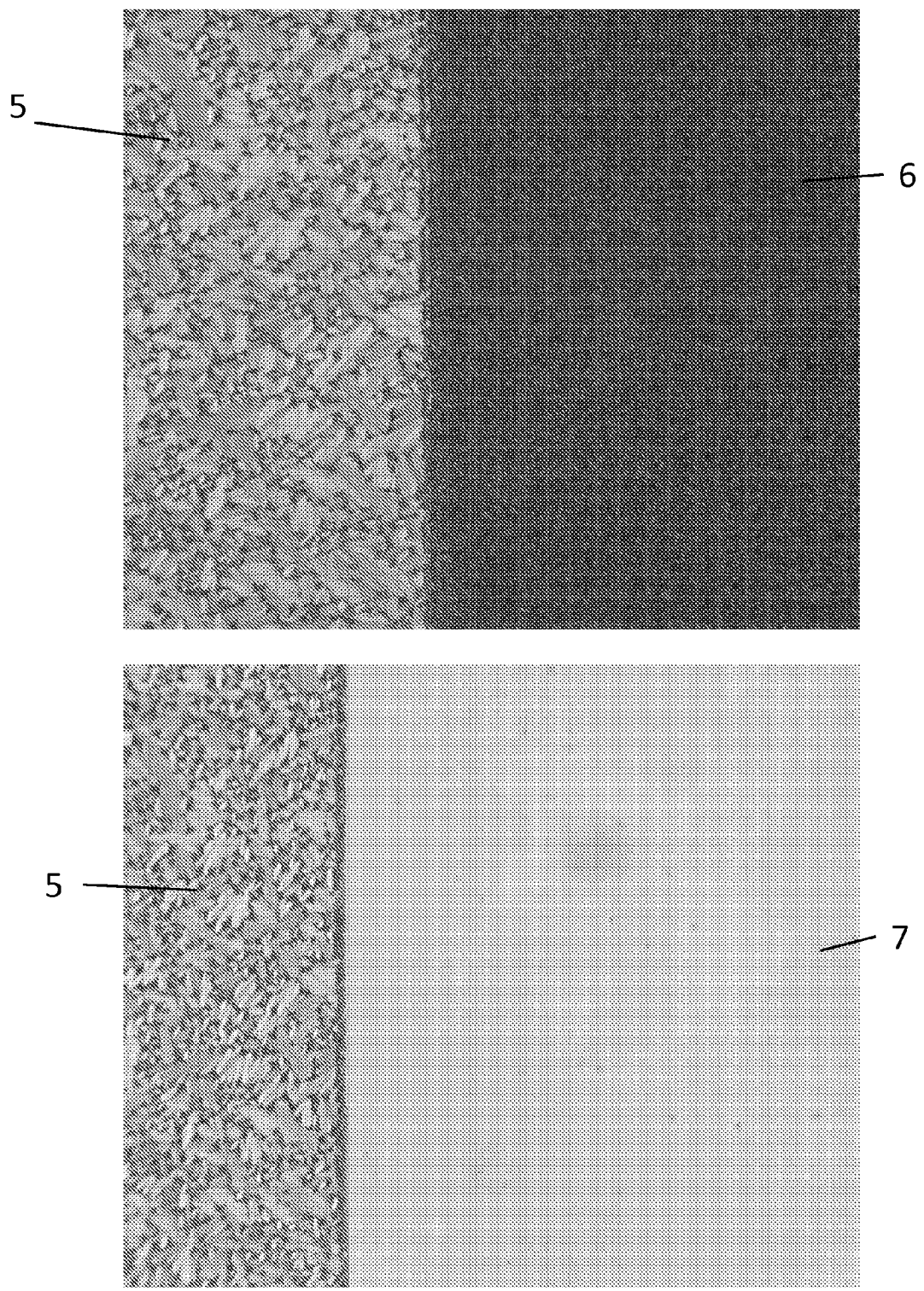
FIG. 2 shows photomicrographs of optical textures for a device in accordance with an embodiment of the present invention.

Photomicrographs of the device using Sample A are shown in FIG. 2. The active (electrode) area is to the right of each picture, with well-developed focal conic fans 5 in the inactive area. The top image shows the stored write mode 6 and the bottom image shows the stored erase mode 7. The distance across the photomicrographs is approximately 500 μm.

To measure the electro-optic performance of Sample A and Sample B, two experiments were carried out. The transmission-voltage and transmission-frequency measurements were recorded on a setup using He—Ne laser (wavelength 632 nm) with a fast photodiode positioned collinearly at a distance of 200 mm after the sample. To ensure a wide probe field of view, the beam diameter was expanded to 5 mm. The voltage amplification system was capable of supplying square wave signals up to 10 kHz with maximum amplitude of 120 $V_{rms}$. The reproducibility of threshold voltage measurement was ±1 V.

The spectrophotometric response was measured on an integrating sphere (FOIS-1, Ocean Optics, Inc) connected to an Ocean Optics HR 2000 spectrometer, recording hemispherical transmission using a calibrated white light source. Experimental control and data gathering were automated using National Instruments LabVIEW software. The samples were capillary-filled into ITO-coated test cells which have an active electrode area of 1 cm² and an electrode separation of 10 μm. The inner substrates of the cell did not contain any alignment layers.

Results

Figure 4:
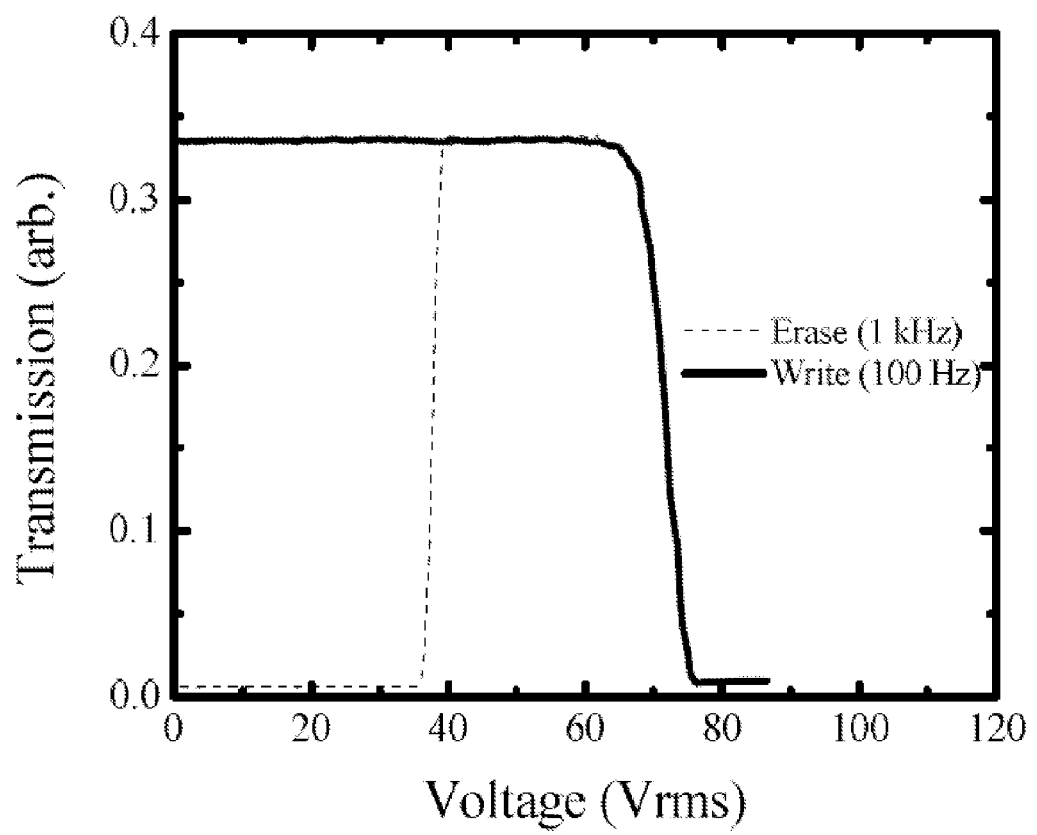
FIGS. 4-8 show transmission curves for various devices in accordance with embodiments of the invention.

Transmission-voltage curves for sample A are shown in FIG. 4. This is a key operational parameter for electro-optical devices. For the write switch (clear to opaque), at 100 Hz, the threshold voltage was found to be 66 Vrms. To switch the device into the erase mode (opaque to clear), on the other hand, a lower voltage of 36 Vrms at 1 kHz, was required. Comparison with conventional PDLCs shows that the smectic A sample exhibits much sharper transmission-voltage curves. Owing to the polydispersity of the droplet sizes, PDLCs typically exhibit a much broader response. In terms of voltage magnitude, the operating voltages are similar to those used for PDLC samples. Consequently, modern voltage drivers, already implemented for PDLC smart windows, can be readily adapted for use in a smectic A device.

Figure 5:
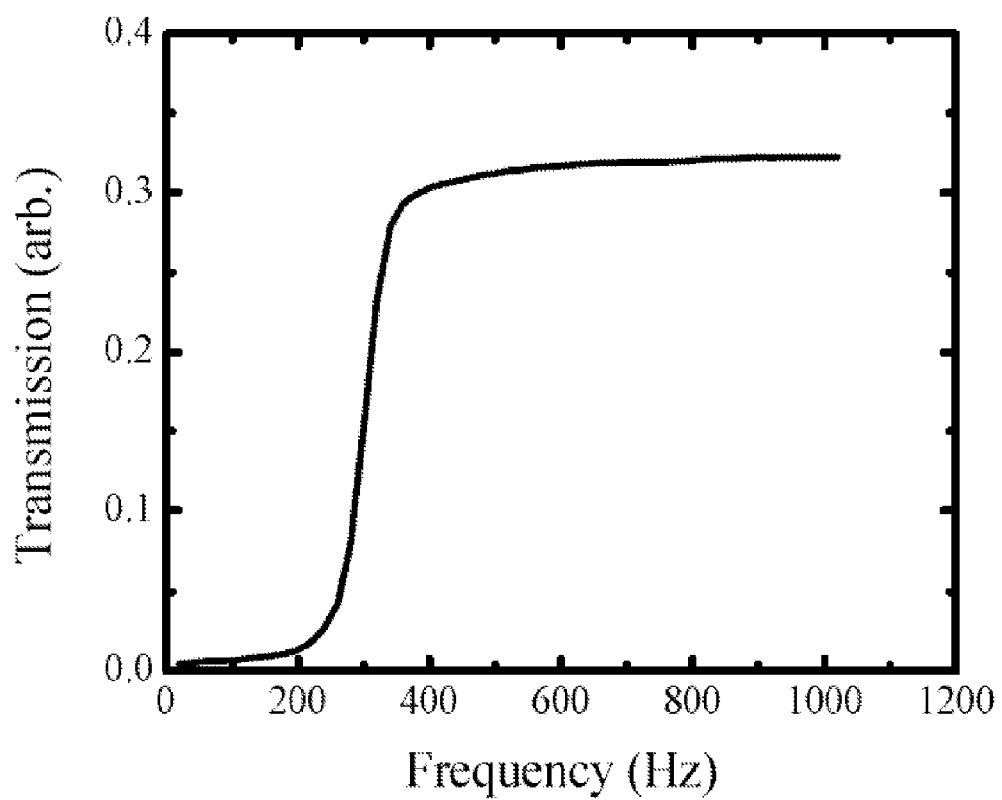

To demonstrate controllability of the transmission of the device using frequency as the variable (i.e. at constant voltage), results are presented in FIG. 5. For this experiment, the frequency was increased at 10 Hz intervals using a fixed applied voltage of 66 Vrms. At low frequencies, the sample scatters light strongly. With increasing frequency above 200 Hz the sample transmission begins to increase—giving a similar response as for the transmission-voltage curves. Full transmission occurs at around 400 Hz. The crossover or critical frequency, where ionic motion is restricted, is given approximately by $f_c \propto \sigma/\in_0\in_r$, where σ is the conductivity; $\in_0$ and $\in_r$ are the dielectric permittivity of free space and relative permittivity, respectively. Therefore, in principle, the operating frequency can be selected through appropriate material design.

Figure 6:
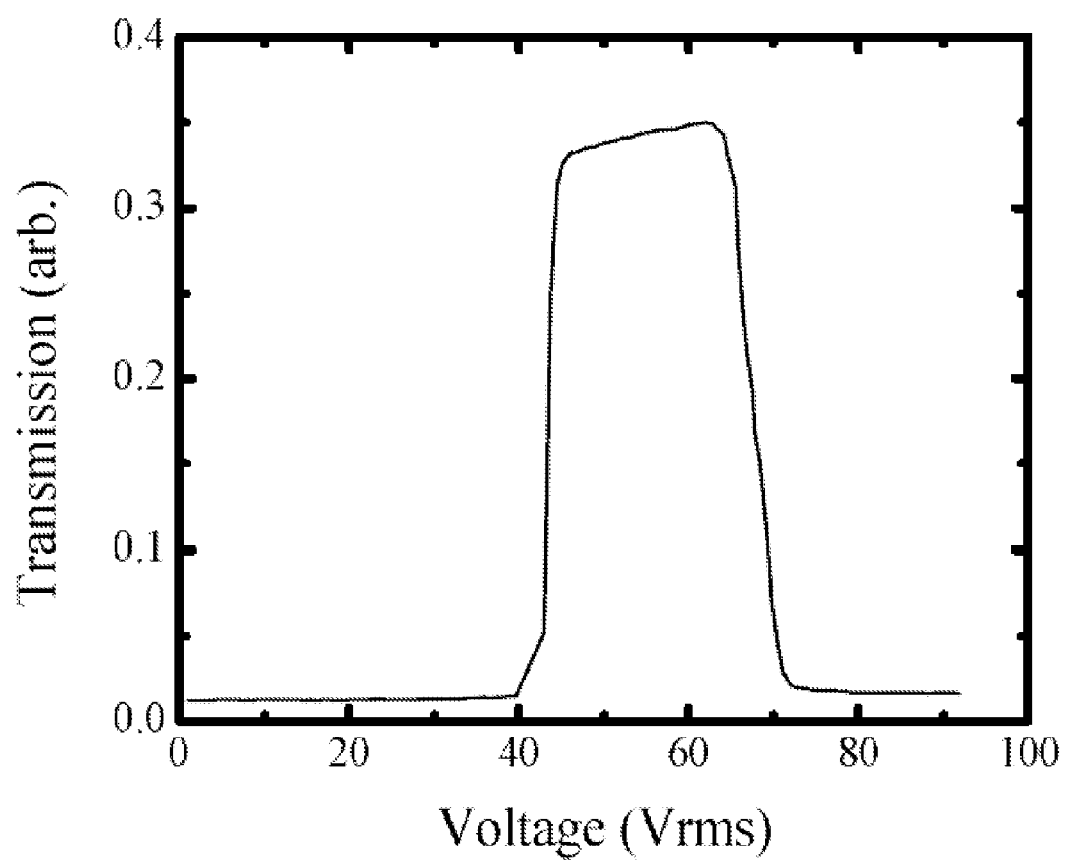

In FIG. 6, a graph of transmission against voltage for an applied frequency of 300 Hz is shown i.e. the middle region of the transmission-frequency curve of FIG. 5. The threshold voltages measured from this graph are altered slightly owing to the effect of frequency on the write and erase modes. However, the figure shows that the device can also operate reversibly at a single fixed frequency. Therefore, in summary, the device can operate in fixed voltage or fixed frequency modes or indeed, variable frequency and voltage. In a preferred embodiment, the materials will be designed to exhibit both write and erase modes at a fixed mains supply of 50 or 60 Hz, for example.

Surprisingly, we have found that the device can also exhibit multistability (ie more than two stable states can be induced). For example, any grey-scale value in between write (opaque) and erase (clear) is also preserved indefinitely after removal of the applied field owing to the layered nature of the smectic A phase; electrically induced textures have been successfully stored for several years.

The response times of the device were measured using the "10-90" criteria. This is defined as the response time taken for the transmission of the sample to increase from 10% to 90% of the total transmission for the "erase" switch, or to fall from 90% to 10% of the transmission for the "write" switch. For an applied voltage of 66 Vrms (1 kHz), the erase response time was 44 ms decreasing to 5 ms at 120V. For the write mode, the response time was 62 ms at 120V (100 Hz). The response time is strongly dependent upon voltage; however, these times are sufficiently fast for slow-update large area windows and optical devices.

For privacy window type applications the standard mode of operation i.e. write (opaque) to erase (clear) is adequate. However, for applications where one wishes to control the amount of light entering an area to a greater degree, it would be necessary to enhance the absorption of the opaque state. This can be achieved via the addition of a dichroic dye which has a preferential axis of absorption. Such dyes typically align with the axis of greater absorption aligned parallel to the liquid crystal director. In this work, the effect of adding a commercial black dichroic dye at a concentration of 4% w/w was examined (Sample B).

Figure 7:
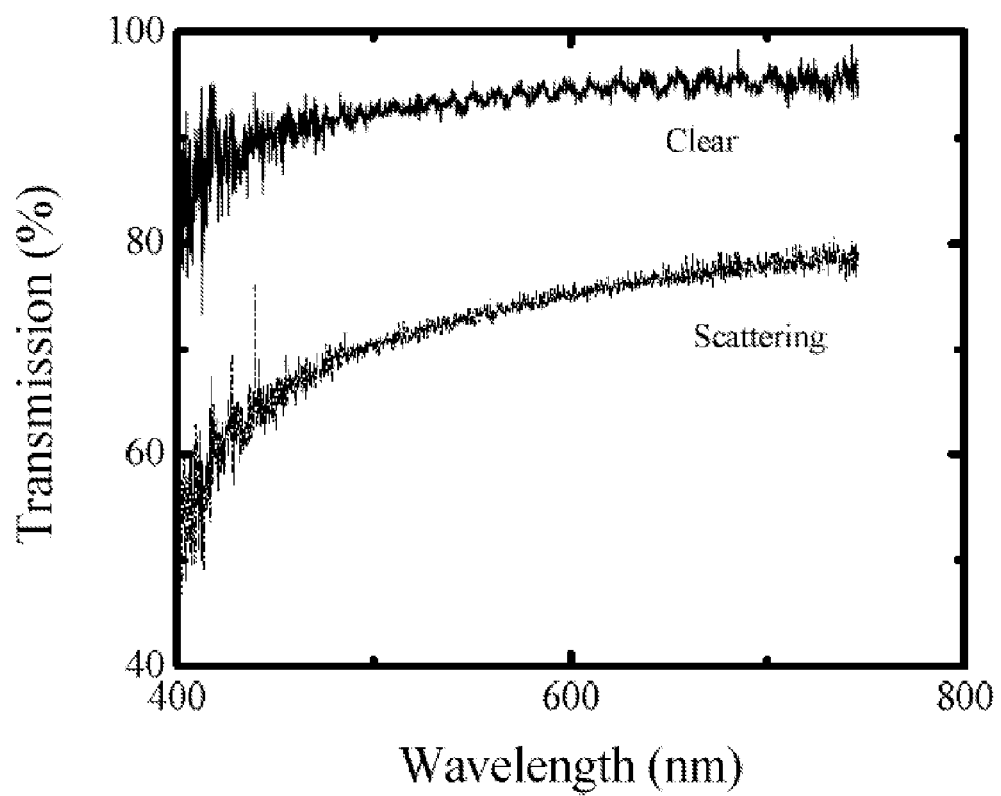
Figure 8:
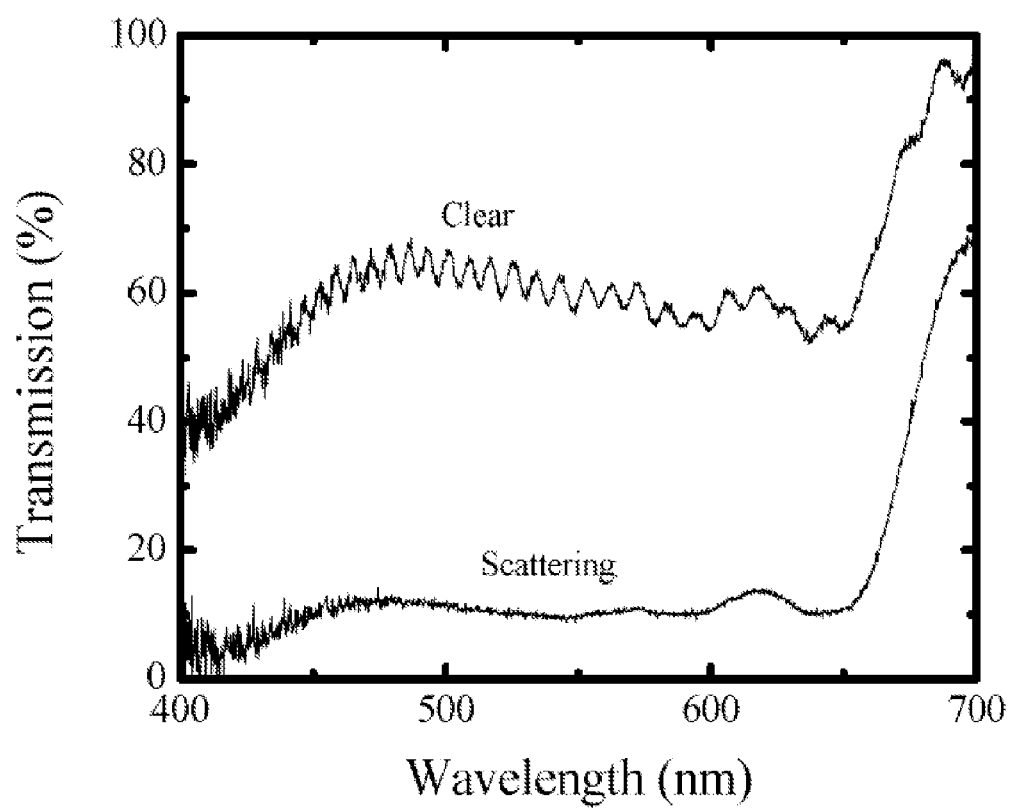

The spectrophotometric responses of the undyed Sample A, and the black dye-doped Sample B, are shown in FIGS. 7 and 8, respectively. The data were recorded using an integrating sphere measuring the hemispherical transmission of the cell. The transmittances for the undyed samples at 500 nm, were around 90% and 70% in the erase (clear) and write (opaque) modes, respectively. The data for the undyed sample show very similar performance to that observed for PDLC transmittances measured in a similar experiment; in that case the values for 'On' and 'Off' were around 70% and 50%, respectively, for a cell thickness of 20 µm—twice the thickness in the present cell. For the dye-doped sample, in the opaque texture, at 490 nm, the transmission is approximately 11% whereas in the clear mode the value is 65%. As a result, the device shows excellent contrast. The switching behaviour of Samples A and B were very similar (within experimental uncertainty); therefore the dye had a minimal effect on these properties.

The transmission data presented in FIGS. 7 and 8 were measured using a calibrated white light source; as such this gives an accurate measure of the visible performance of the device, including the transmission of the visible part of the solar spectrum.

For certain applications e.g. smart glazing for external surfaces, it is important that the liquid crystal material is stable to ultraviolet (UV) wavelengths. To check UV stability, a sample was placed in a lithographic UV oven. The intensity of the lamp was 11 mW/cm$^2$ with a total exposure energy of 200 J (5 hours continuous exposure) in the UV-A part of the spectrum (315 nm-400 nm). The threshold voltages of both the "write" and "erase" modes remained unchanged after exposure—within the experimental uncertainty of +/−1V. The UV stability of the organosiloxane Smectic A liquid crystals is expected to be similar to or superior to nematic liquid crystals used in PDLCs since the fundamental chemistry (e.g. the presence of an aromatic core group) is almost identical in these materials. However, mixtures formulated from the organosiloxane liquid crystals are potentially environmentally (including UV) more stable owing to simpler composition i.e. there are fewer components required to enhance the operating temperature range.

In terms of thermal stability, especially in applications where the device is in direct sunlight, the upper limit of operation is determined by the Smectic A transition temperature of the material. In the mixture used in this study, the upper limit is 74° C. It is to be expected that this temperature limit will rise with further optimisation of the mixture.

Discussion

Although both PDLC and the Smectic A technology are based on electro-optic effects in liquid crystals there are several important differences. The scattering effect in PDLCs arises from the refractive index contrast between liquid crystal droplets and the surrounding polymer matrix into which they are suspended. In the ON-state (clear), when viewed at wide angles, the film exhibits haze. In addition, considerable attention must be given to proper choice of the droplet size, such that scattering is maximized. This can be done by reducing the droplet diameter. However, a trade-off has to be made as a reduction in the droplet diameter results in an increase in the driving voltage (to a first approximation V~1/d, where d is the droplet diameter). Further, as the mean droplet size reduces, PDLC films scatter blue and green light efficiently whilst transmitting red light without significant scatter ('red bleedthrough').

For the Smectic A device, in the clear state, the refractive index is homogeneous and so the device is equally transparent at all angles. The main other difference between the schemes is that in the Smectic A case both modes are preserved indefinitely after removal of the field; for the PDLC, restoring forces within the droplet return the liquid crystal molecules back to the unoriented state in the absence of a field. Since the scattering effect in the Smectic A phase is not dependent upon encapsulating the liquid crystal in droplets the other issues such as wavelength dependent scatter and variable drive voltages are removed.

Although bistable effects in smectic A liquid crystals have been known for some time, there have been several factors, hitherto, that have inhibited the adoption of the technology. Driving voltages have been too high, especially for generation of the scattering (opaque) texture. Indeed, it is typical to have to pre-form devices such that this texture can be observed. Further, commercial materials of sufficiently wide temperature range have not been produced.

Another important factor is the high degree of conductivity anisotropy in these systems, which are several orders of magnitude greater than materials used hitherto (alkylcyanobiphenyls). From Equation 1, along with the parallel dielectric permittivity, this parameter controls the write (opaque) threshold voltage. Separately, it has also been shown that it is possible to control the relative magnitudes of the write and erase threshold voltages by manipulation of the conductivity and dielectric properties. For example, it is possible to have samples in which the scattering voltage is lower than the clearing voltage by lowering the conductivity ratio, $\sigma_{\parallel}/\sigma_{\perp}$, or to have samples in which the threshold voltages are identical. This allows substantial flexibility in designing custom drivers for different applications, if so desired.

The key molecular property in embodiments of these systems, from which the useful properties of wide temperature range and high conductivity anisotropy arise, is the self-assembly of the constituent molecular parts, namely mesogenic core (eg based upon biphenyl, alkylene chain and siloxane group) into distinct regions within the molecular layers. This property appears to stabilize the smectic A phase relative to the nematic liquid crystal phase, and acts to increase the conductivity anisotropy.

Applications

Without limiting the invention in any way, embodiments of the present invention are envisaged as being of particular use in the following areas.

1. Smart windows. This market currently relies on polymer-dispersed liquid crystal technology (PDLC). Owing to the reduced drive voltages, and lack of requirement to pre-form devices, smectic A materials could be an attractive and slot-in alternative to PDLC materials; the main advantage being much reduced power consumption through bistable operation. Current PDLC screens require a voltage to be continually applied in order to maintain the clear state. We calculate that for one hour's operation (with both devices in the ON-state) the Smectic A device would have a power consumption about 8% of that of the PDLC; this decreases with further ON-state time. Another advantage is simpler driving technology. A Smectic A device according to an embodiment of the invention can be driven off direct mains supply, eg 110 V or 240 V. The device also offers superior optical performance at wider viewing angles, having no viewing angle-dependent haze in the ON(clear)-state. Further, any intermediate value of transmission between clear and scattering can also be stored indefinitely.

2. Slow update and storage displays e.g. electronic poster boards (e.g. via dye-doping), electronic newspaper-type applications or simple display devices (e.g. reflective, dye-doped etc.) including low cost hand-held devices.

Hybrid Systems

In some practical applications, it is useful to disperse the smectic liquid crystal material in a polymer system e.g. via an emulsion method, solvent induced phase separation, temperature induced phase separation, photoinduced phase separation This allows low cost manufacturing, or production of flexible displays, of an electro-optic device or display without losing the functionality of the material and device. The functionality of such devices may be further increased by adding dichroic (or other chromophores) dyes.

The functionality of the entire mixture may be further enhanced by the addition of so-called nanoparticles. These may be carbon based (such as nanotubes, C60-type structures and soluble derivatives etc.) but could also include ferroelectric particles which can introduce other desirable properties (for example, $BaTiO_3$, $LiNbO_3$, SBN, $KNbO_3$). The added properties include greater dielectric coupling to an applied field to reduce operating voltages or to facilitating generation of the scattering texture.

Previously, limited display lifetime has been noted; this is usually exhibited through gradual loss of contrast between the scattering and clear modes or by the appearance of degradation products within the cell. Lifetime can be improved by the use of alternative drive schemes, or the use of Reduction and Oxidation dopants. These dopants perform by allowing reversible charge transfer so that the contrast remains constant over time. The Reduction and Oxidation dopants are typically present at low concentrations, less than 10% w/w, and may be liquid crystalline or non-liquid crystalline (including metallic based liquid crystals and materials) and siloxane or non-siloxane containing. Further, electrochromic materials (e.g. Viologen compounds or electrochromic liquid crystal derivatives) may be incorporated to add colour to displays via an electrochemically induced colouration.

Smectic C Mixture

Although many silicon-containing mesogenic materials induce a Smectic A phase in wide temperature-range nematic mixtures, we have surprisingly found that suitable silicon-containing materials may also induce other polymorphic modifications with a wide temperature range. In particular, a mixture of 40% w/w of compound (e) (below) in BL006 produced a chiral Smectic C phase of extremely wide temperature range.

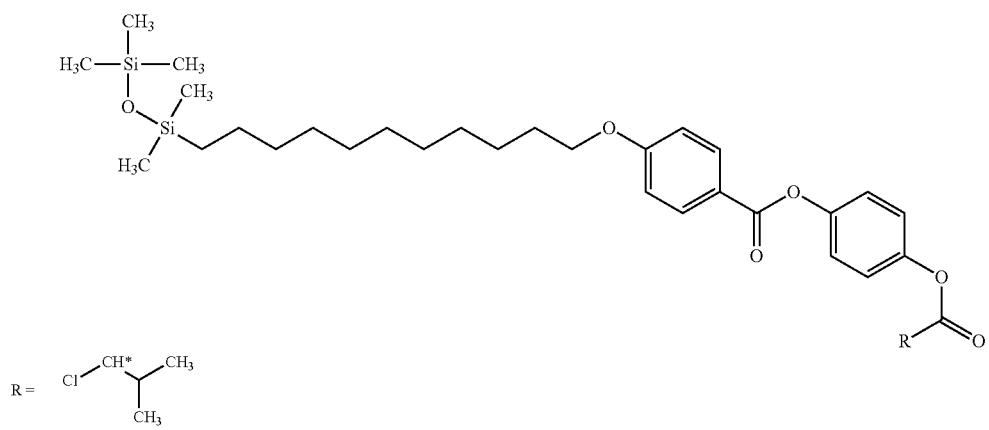

e)

The isotropic to Smectic C* transition occurs at 86° C., with supercooling down to room temperature. The smectic phase width of the pure siloxane is up to 59° C.—significantly less than the combined mixture.

A principal application of wide temperature-range Smectic C materials is expected to be in ferroelectric and antiferroelectric devices. The ability to produce chiral Smectic C materials with a tailored range of properties—including, if desired, an optional nematic phase to allow desired alignments to be achieved—is expected to allow a range of mixtures to be fine tuned for particular applications. For example, we have found that using the chiral bimesogenic structural variant of e), with the silicon moiety comprising an —Si—O—Si—O—Si— grouping, an antiferroelectric phase can readily be generated.

The invention claimed is:

1. A method of making a wide temperature-range smectic liquid crystal material, the method comprising taking a wide temperature-range nematic mixture and doping this with a mesogenic silicon-containing material, wherein said wide temperature ranges are at least 70° C.

2. A method according to claim 1, wherein the mesogenic silicon-containing material is a compound represented by the following general formula (I) and/or a compound represented by the following general formula (II):

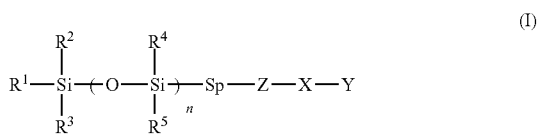

(I)

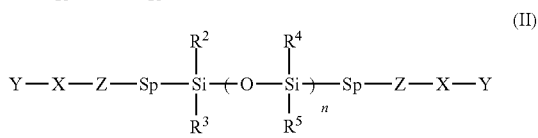

(II)

wherein $R^1$, $R^2$, $R^3$, $R^4$ and $R^5$ are each independently a straight chain or branched alkyl group with 1 to 25 C atoms which may be unsubstituted, mono- or polysubstituted by halogen or CN, it also being possible for one or more non-adjacent $CH_2$ groups to be replaced, in each case independently from one another, by —O—, —S—, —NH—, —N($CH_3$)—, —CO—, —COO—, —OCO—, —O—CO—O—, —S—CO—, —CO—S—, —CH=CH—, —CH=CF—, —CF=CF—, or —C≡C— in such a manner that oxygen atoms are not linked directly to one another;

n is an integer of 0 to 10;

X is a mesogenic moiety;

Sp is an optional spacer group comprising 0 to 40 C atoms, wherein one or more non-adjacent $CH_2$ groups may also be replaced by —O—, —S—, —NH—, —N($CH_3$)—, —CO—, —COO—, —OCO—, —O—CO—O—, —S—CO—, —CO—S—, —CH(halogen)-, —CH(CN)—, —CH=CH—, or —C≡C—;

Z is —O—, —S—, —CO—, —COO—, —OCO—, —O—CO—O—, —CO—NH—, —NH—CO—, —OCH$_2$—, —SCH$_2$—, —CH=CH—, —C≡C— or a single bond;

Y is F, Cl, CN, NCS, or a straight-chain or branched alkyl group with 1-25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF—, or —C≡C— in such a manner that oxygen atoms are not linked directly to one another.

3. A method according to claim 1, wherein the mesogenic silicon-containing material is a compound represented by the following general formula (III) and/or a compound represented by the following general formula (IV):

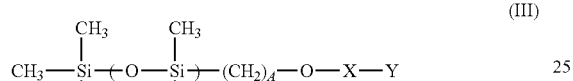

(III)

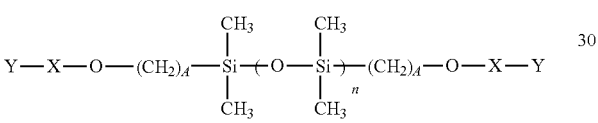

(IV)

where n is an integer of 0 to 10, A is an integer of 0 to 15, X is a mesogenic moiety, and Y is a cyano group, a halogen, an alkyl group, an alkoxy group, or an ester; the alkyl group, the alkoxy group or the ester optionally carrying a halogen substituent.

4. A method according to claim 2, wherein X is a moiety of formula (V):

(V)

wherein

M is —COO—, —OCO—, —O—CO—O—, —OCH$_2$—, —CH$_2$O—, —CH$_2$CH$_2$—, —(CH$_2$)$_4$—, —CF$_2$CF$_2$—, —CH=CH—, —CF=CF—, —CH=CH—COO—, —OCO—CH=CH—, —C≡C— or a single bond, B$^1$ and B$^2$ are each independently 1,4-phenylene, wherein in addition one or more CH groups may be replaced by N, trans-1,4-cyclohexylene in which, in addition, one or two non-adjacent CH$_2$ groups may be replaced by O and/or S, 1,4-cyclohexylene in which, in addition, one or two non-adjacent CH$_2$ groups may be replaced by O and/or S, 1,4-cyclohexenylene, 1,4-bicyclo(2,2,2)-octylene, piperidine-1,4-diyl, naphthalene-2,6-diyl, decahydro-naphthalene-2,6-diyl, 1,2,3,4-tetrahydro-naphthalene-2,6-diyl, cyclobutan-1,3-diyl, spiro[3.3]heptane-2,6-diyl or dispiro[3.1.3.1]decane-2,8-diyl, it being possible for all these groups to be unsubstituted, mono-, di-, tri- or tetrasubstituted with F, Cl, CN or alkyl, alkoxy, alkylcarbonyl or alkoxycarbonyl groups with 1 to 7 C atoms, wherein one or more H atoms may be substituted by F or Cl;

m is 0, 1, 2 or 3.

5. A method according to claim 4, wherein X is selected from:

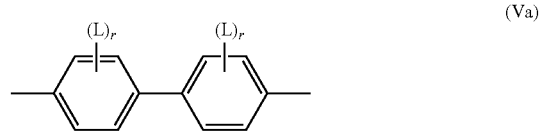
(Va)

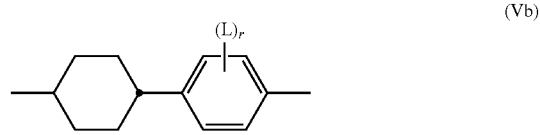
(Vb)

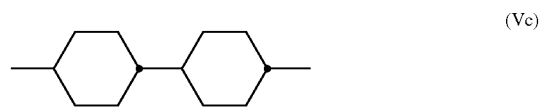
(Vc)

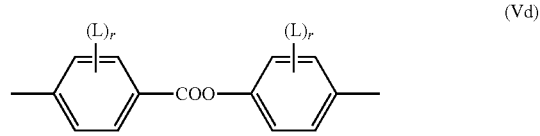
(Vd)

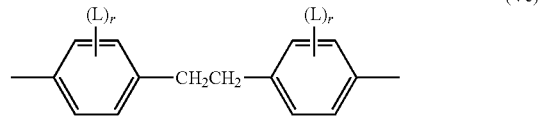
(Ve)

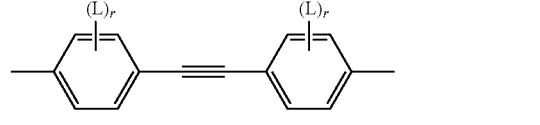
(Vf)

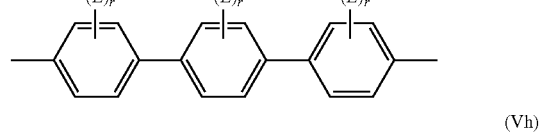
(Vg)

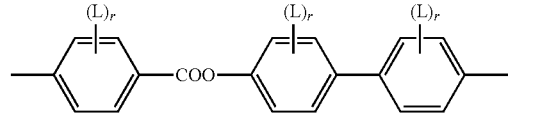
(Vh)

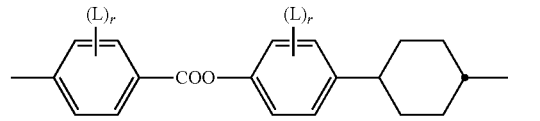
(Vi)

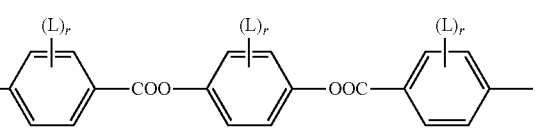
(Vj)

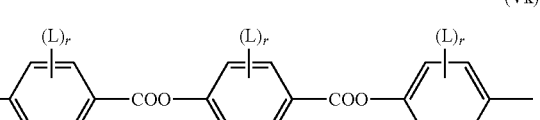
(Vk)

-continued

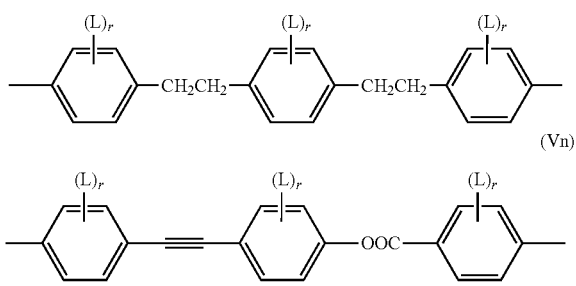

(Vm)

(Vn)

wherein L is F, Cl, CN, OH, NO$_2$ or an optionally fluorinated alkyl, alkoxy or alkanoyl group with 1 to 7 C atoms, and r is 0, 1 or 2.

6. A method according to claim 1, wherein the mesogenic silicon-containing material makes up from 20-80% of the smectic liquid crystal material by weight.

7. A method according to claim 2, wherein X is a 4-biphenyl-4'-yl moiety.

8. A method according to claim 2, wherein X is a 4'-phenyl-4-benzoate moiety.

9. A method according to claim 1, wherein the smectic liquid crystal is a smectic A material and wherein the mesogenic silicon-containing material is a compound represented by the following general formula (a) and/or a compound represented by the following general formula (b) and/or a compound represented by the following general formula (c):

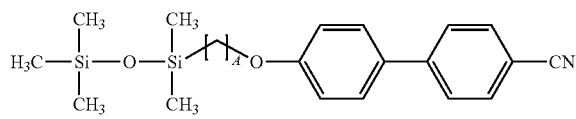

(a)

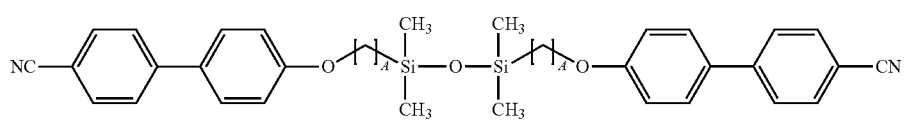

(b)

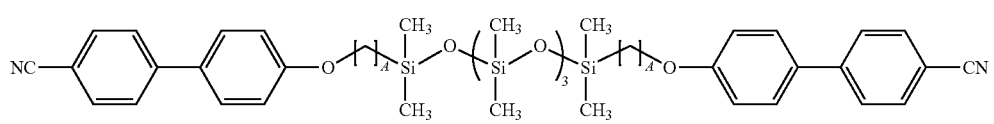

(c)

wherein A is an integer of 0-15.

10. A method according to claim 3, wherein A is an integer of 5-11.

11. A method according to claim 1, wherein the smectic liquid crystal is a smectic C material.

12. A method according to claim 11, wherein the mesogenic silicon-containing material is optically active and wherein the smectic C material is ferroelectric.

13. A method according to claim 12 wherein the mesogenic silicon-containing material is of the following general formula (d):

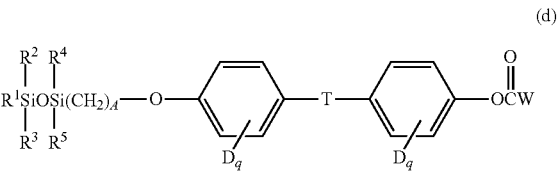

(d)

wherein R$^1$ is an alkyl group having from 1 to 10 carbon atoms or the group

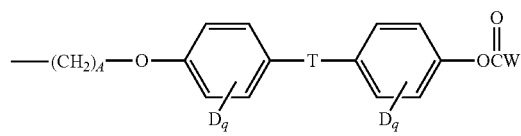

R$^2$, R$^3$, R$^4$ and R$^5$ are each independently an alkyl group having from 1-4 C atoms;

T is —OCO— or —COO—

W is an alkyl or halogen-substituted alkyl group having at least one chiral centre;

D is a fluorine atom, q has a value of 0, 1 or 2; and

A has a value of 10, 11 or 12.

14. A method according to claim 2, wherein R$^2$, R$^3$, R$^4$ and R$^5$ are each the same.

15. A method according to claim 12, wherein the mesogenic silicon-containing material is a compound of formula (e):

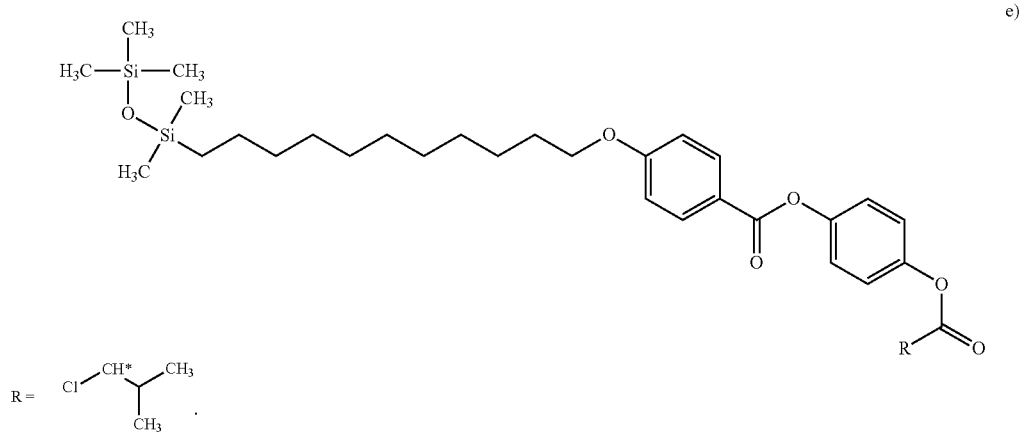

e)

16. A method according to claim 1, wherein the nematic mixture exhibits the nematic phase over at least the range −20° C. to +50° C., and wherein the resultant smectic material exhibits the smectic phase over at least the same temperature range.

17. A method according to claim 1, wherein the nematic mixture exhibits the nematic phase down to −30° C. or lower, and wherein the resultant smectic material exhibits the smectic phase down to at least the same temperature.

18. A method according to claim 1, wherein the nematic mixture exhibits the nematic phase up to at least 80° C., and wherein the resultant smectic material exhibits the smectic phase up to at least the same temperature.

19. A method according to claim 1, further comprising adding a chiral additive to the mixture to form a composition having a chiral additive concentration of less than 3% by weight.

20. A wide temperature-range smectic liquid crystal material including a mesogenic silicon-containing material in a host mixture, the host mixture being a wide temperature-range nematic mixture in the absence of the silicon-containing material, wherein said wide temperature ranges are at least 70° C.

21. A bistable display device or light shutter comprising first and second cell walls enclosing a layer comprising or including a smectic material as specified in claim 20, and electrodes for applying an electric field across or along at least some of the layer.

22. A display device or light shutter according to claim 21, wherein the layer further comprises a polymer matrix within which is dispersed the smectic material.

23. A light shutter according to claim 21, wherein the material exhibits a smectic A phase, each cell wall is translucent and wherein an inner surface of each cell wall carries a translucent electrode so as to enable bistable switching between a light-transmitting state and a light-scattering or light-absorbing state across substantially the entire area of the cell walls.

24. A device or light shutter according to claim 21, wherein the smectic material further comprises a reduction/oxidation dopant in a concentration of 0.01% to 5% by weight.

25. A method of addressing a display device or light shutter as specified in claim 21, the method comprising applying an electric field across the layer at a substantially constant voltage and varying the frequency to effect a change in the optical state of the smectic material.

26. A method of addressing a display device or light shutter as specified in claim 21, the method comprising applying an electric field across the layer at a fixed frequency, and varying the voltage to effect a change in the optical state of the smectic material.

27. A bistable display device or light-emitting device, comprising first and second cell walls enclosing a composite structure comprising a smectic material as specified in claim 20 which exhibits a smectic A phase, and a light-emissive material, and electrodes for applying an electric field across at least some of the composite structure.

28. A device according to claim 27, wherein the smectic material and the light-emissive material are present as discrete layers each of which is addressable by the electrodes.

29. A device according to claim 27, wherein the smectic material and the light-emissive material are present as a mixture in a single composite layer.

30. A device according to claim 27, wherein the light-emissive material comprises an electroluminescent layer.

31. A display device according to claim 21, wherein the material exhibits a ferroelectric or antiferroelectric smectic phase, and wherein an inner surface of each cell wall carries an electrode so as to enable bistable switching between two optically distinguishable states; the device further comprising means for distinguishing between said states.

32. A wide temperature-range smectic liquid crystal material according to claim 20, wherein the silicon-containing material comprises at least one compound having general formula (I), (II), (III) or (IV):

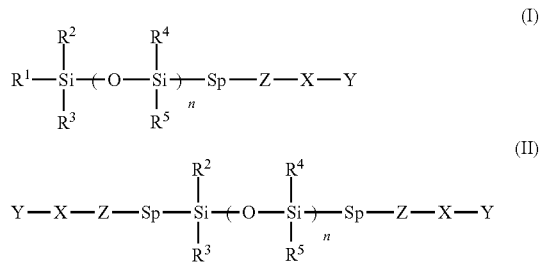

wherein
$R^1$, $R^2$, $R^3$, $R^4$ and $R^5$ are each independently a straight chain or branched alkyl group with 1 to 25 C atoms which may be unsubstituted, mono- or polysubstituted by halogen or CN, it also being possible for one or more non-adjacent CH, groups to be replaced, in each case independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF—, or —C≡C— in such a manner that oxygen atoms are not linked directly to one another;

n is an integer of 0 to 10;

X is a mesogenic moiety;

Sp is an optional spacer group comprising 0 to 40 C atoms, wherein one or more non-adjacent CH$_2$ groups may also be replaced by —O—, —S—, —NH—, —N(CH$_3$)—, —CO—, —COO—, —OCO—, —O—CO—O—, —S—CO—, —CO—S—, —CH(halogen)-, —CH(CN)—, —CH=CH—, or —C≡C—;

Z is —O—, —S—, —CO—, —COO—, —OCO—, —O—CO—O—, —CO—NH—, —NH—CO—, —CH$_2$CH$_2$—, —OCH$_2$—, —SCH$_2$—, —CH=CH—, —CH=CH—COO—, —OCO—CH=CH—, —C≡C— or a single bond;

Y is F, Cl, CN, NCS, or a straight-chain or branched alkyl group with 1-25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —O—CO—O—, —S—CO—, —CO—S—, —CH=CH—, —CH=CF—, —CF=CF—, or —C≡C— in such a manner that oxygen atoms are not linked directly to one another;

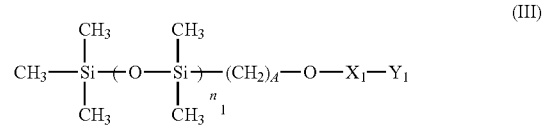

(III)

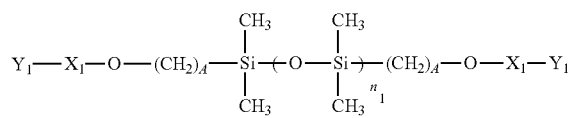

(IV)

where $n_1$ is an integer of 0 to 10, A is an integer of 0 to 15, $X_1$ is a mesogenic moiety, and $Y_1$ is a cyano group, a halogen, an alkyl group, an alkoxy group, or an ester; the alkyl group, the alkoxy group or the ester optionally carrying a halogen substituent.

* * * * *

UNITED STATES PATENT AND TRADEMARK OFFICE
CERTIFICATE OF CORRECTION

PATENT NO. : 8,980,383 B2  
APPLICATION NO. : 13/140145  
DATED : March 17, 2015  
INVENTOR(S) : Harry J. Coles and Damian J. Gardiner It is certified that error appears in the above-identified patent and that said Letters Patent is hereby corrected as shown below:

In the Claims

Claim 2, Column 15, lines 5–6:

Please change "$-OCH_2-$, $-SCH_2-$, $-CH=CH-$, $-C\equiv C-$ or a single bond;" to -- $-CH_2CH_2-$, $-OCH_2-$, $-SCH_2-$, $-CH_2S-$, $-CH=CH-$, $-CH=CH-COO-$, $-OCO-CH=CH-$, $-C\equiv C-$ or a single bond; --

Claim 32, Column 21, line 2:

Please change "non-adjacent CH, groups to be replaced, in each case" to -- non-adjacent $CH_2$ groups to be replaced, in each case --

Signed and Sealed this  
Twenty-first Day of July, 2015

Michelle K. Lee  
*Director of the United States Patent and Trademark Office*

UNITED STATES PATENT AND TRADEMARK OFFICE
CERTIFICATE OF CORRECTION

PATENT NO.       : 8,980,383 B2
APPLICATION NO.  : 13/140145
DATED            : March 17, 2015
INVENTOR(S)      : Harry J. Coles and Damian J. Gardiner Page 1 of 1

It is certified that error appears in the above-identified patent and that said Letters Patent is hereby corrected as shown below:

In the Claims

Claim 32, Column 21, line 19:

Please change "$CH_2CH_2-$, $-OCH_2-$, $-SCH_2-$, $-CH=CH-$," to -- $-CH_2CH_2-$, $-OCH_2-$, $-SCH_2-$, $-CH_2S-$, $-CH=CH-$, --

Signed and Sealed this
Tenth Day of November, 2015

Michelle K. Lee
*Director of the United States Patent and Trademark Office*

UNITED STATES PATENT AND TRADEMARK OFFICE
CERTIFICATE OF CORRECTION

PATENT NO. : 8,980,383 B2
APPLICATION NO. : 13/140145
DATED : March 17, 2015
INVENTOR(S) : Harry J. Coles and Damian J. Gardiner It is certified that error appears in the above-identified patent and that said Letters Patent is hereby corrected as shown below:

In the Claims

Claim 32, Column 21, line 19:

Please change "-$CH_2CH_2$-, –$OCH_2$–, –$SCH_2$–, –CH=CH–," to -- –$CH_2CH_2$–, –$OCH_2$–, –$SCH_2$–, –$CH_2S$–, –CH=CH–, --

This certificate supersedes the Certificate of Correction issued November 10, 2015.

Signed and Sealed this
Twelfth Day of April, 2016

Michelle K. Lee
*Director of the United States Patent and Trademark Office*